(12) United States Patent
Schweiher et al.

(10) Patent No.: US 8,344,565 B2
(45) Date of Patent: Jan. 1, 2013

(54) ACTUATOR ARRANGEMENT AND SHIFT-CLUTCH ARRANGEMENT

(75) Inventors: Mark Schweiher, Lauffen (DE); Uli Christian Blessing, Heilbronn (DE); Thorsten Gatzka, Heilbronn (DE); Ulrich Knoedel, Ingersheim (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 591 days.

(21) Appl. No.: 12/203,843

(22) Filed: Sep. 3, 2008

(65) Prior Publication Data

US 2009/0066169 A1  Mar. 12, 2009

Related U.S. Application Data

(63) Continuation of application No. PCT/EP2007/001785, filed on Mar. 2, 2007.

(30) Foreign Application Priority Data

Mar. 27, 2006 (DE) .................. 10 2006 015 688

(51) Int. Cl.
 *H02K 7/06* (2006.01)
 *F16D 11/14* (2006.01)
 *F16D 28/00* (2006.01)
(52) U.S. Cl. ........ 310/80; 74/335; 74/473.12; 192/48.2; 192/69.9; 192/84.6
(58) Field of Classification Search .............. 192/84.92, 192/53.2; 310/154.21, 154.23; 74/424.76
See application file for complete search history.

(56) References Cited

U.S. PATENT DOCUMENTS

| 1,014,622 | A | * | 1/1912 | Dinkins et al. ........... 310/154.21 |
| 4,865,173 | A | * | 9/1989 | Leigh-Monstevens et al. ............................ 192/3.56 |
| 5,205,179 | A | | 4/1993 | Schneider |
| 5,337,627 | A | * | 8/1994 | Nakamura ................. 74/424.76 |
| 5,829,557 | A | | 11/1998 | Halasy-Wimmer et al. |

FOREIGN PATENT DOCUMENTS

| DE | 195 11 287 B4 | 1/1996 |
| DE | 199 47 405 A1 | 4/2001 |
| DE | 100 21 368 A1 | 11/2001 |
| DE | 101 03 664 A1 | 8/2002 |
| DE | 10 2005 017 026 A1 | 4/2005 |
| DE | 10 2004 013 450 B4 | 9/2005 |
| GB | 2 127 917 A | 4/1984 |

OTHER PUBLICATIONS

Translation of DE 10 2005 017 026 Al, Oyen et al., Dec. 2005.*
PCT/EP2007/001785; Filed Feb. 3, 2007; International Search Report.

* cited by examiner

*Primary Examiner* — Rodney Bonck
(74) *Attorney, Agent, or Firm* — Knobbe, Martens, Olson & Bear, LLP

(57) ABSTRACT

An actuator arrangement for the axial displacement of an actuation member by means of a drive force which is generated by an electric machine, in particular for a shift-clutch arrangement of a multi-step gear change transmission. The actuation member is mounted axially displaceably on a rotary shaft. The electric machine has a stator fixed to a housing and a rotor which is coupled to the actuation member and is arranged coaxially with respect to the actuation member. The rotor is coupled to the actuation member with a form fit in the axial direction. Here, the rotor or the actuation member has a radial projection which engages into a radial groove of the other part.

10 Claims, 3 Drawing Sheets

ACTUATOR ARRANGEMENT AND SHIFT-CLUTCH ARRANGEMENT

CROSS-REFERENCE TO RELATED APPLICATIONS

This is a Continuation application of International patent application PCT/EP 2007/001785, filed Mar. 2, 2007, which claims the priority of German patent application DE 10 2006 015 688.9, filed Mar. 27, 2006.

BACKGROUND OF THE INVENTION

The present invention relates to an actuator arrangement for the axial displacement of an actuation member by means of a drive force which is generated by an electric machine, in particular for a shift-clutch arrangement of a multi-step gear change transmission, the actuation member being mounted axially displaceably on a rotary shaft, the electric machine having a stator fixed to a housing and a rotor which is coupled to the actuation member and is arranged coaxially with respect to the actuation member, and the rotor being coupled to the actuation member with a form fit in the axial direction.

An actuator arrangement of this type is known from the document DE 101 03 664 A1.

The present invention relates, furthermore, to a shift-clutch arrangement for a multi-step gear change transmission, in particular for motor vehicles, with a guide sleeve which is secured to a rotary shaft and has a guide-sleeve toothing, with a shift sleeve having a shift-sleeve toothing which is in engagement with the guide-sleeve toothing, so that the shift sleeve is mounted fixedly in terms of rotation and axially displaceably with respect to the rotary shaft, and with a clutch body which is secured to a loose wheel mounted rotatably on the rotary shaft and which has a clutch-body toothing, into which the shift-sleeve toothing can be pushed in order to connect the loose wheel fixedly in terms of rotation to the rotary shaft, the shift sleeve being axially displaceable by means of an actuator arrangement.

The document DE 100 21 368 A1 discloses a mechatronic actuator, in which a rotor of an electric motor is designed as a ring wheel, as a planet carrier or as being integrated into the planet wheels of a planet-wheel set. A sun wheel of the planet-wheel set is designed as a spindle for a linear drive.

An electromechanically actuable disc brake is known from the document DE 195 11 287 B4. A rotor is designed as a hollow shaft and surrounds a reduction gear in the form of a roller-thread mechanism, the output member of which serves as an actuation member for the disc brake. An epicyclic gear may be inserted between the rotor and the roller-thread mechanism.

The document DE 10 2004 013 450 B4 relates to a shift device for a motor-step gear change transmission. The shifting and synchronizing operations are implemented electromagnetically. A loose wheel and a guide sleeve are designed for carrying a magnetic flux which is generated by a stator. Shift pins are mounted axially displaceably on the guide sleeve and serve for making a form fit with a loose wheel.

The document DE 199 47 405 A1 discloses a multi-step gear change transmission of the countershaft type of construction, in which a shift sleeve of a synchronizing shift clutch can be actuated by means of an electric linear stepping motor. The stepping motor may be designed as a reluctance motor and be accommodated in the transmission housing.

Furthermore, the above-mentioned document DE 101 03 664 A1 discloses a synchronizing device, in which the shift sleeve is designed as part of the electric drive. In this case, the drive may be designed as a linear motor or as a rotational drive. In the latter instance, the shift sleeve is mounted rotatably with respect to a spindle, but displaceably together with the latter, via rolling or plain bearings. The spindle carries an electromotive component and with two spindle nuts supported on the housing forms a rotation/translation converter.

Document DE 10 2005 017 026 A1 discloses an actuator arrangement for a shift clutch arrangement, wherein the actuator arrangement comprises an electric machine which is arranged concentrically with respect to a rotational axis and comprises a stator fixed to a housing and a rotor. The rotor is coupled to a ring element via a pin and a coil spring. The ring element can be displaced axially against the stator by suitable measures, but cannot be rotated with respect to the latter. The ring element comprises a ring projection provided at the inner periphery thereof, the ring projection engaging a peripheral groove in a shift sleeve of the shift clutch arrangement. Thus, the rotor is driven only if an axial displacement of the shift sleeve is desired.

BRIEF SUMMARY OF THE INVENTION

Against this background, the object of the invention is to specify an improved actuator arrangement.

The above object is achieved, according to a first aspect of the present invention, by an actuator arrangement for the axial displacement of an actuation member by means of a drive force which is generated by an electric machine, in particular for a shift-clutch arrangement of a multi-step gear change transmission, the actuation member being mounted axially displaceably on a rotary shaft, the electric machine having a stator fixed to a housing and a rotor which is coupled to the actuation member and is arranged coaxially with respect to the actuation member, and the rotor being coupled to the actuation member with a form fit in the axial direction; wherein the rotor or the actuation member has a radial projection which engages into a radial groove of the other part.

In this embodiment, it is particularly advantageous that the form-fit coupling between the rotor and actuation member can be implemented in a structurally beneficial way, no special bearings, such as rolling bearings or plain bearings, being required.

The actuator arrangement can consequently be implemented cost-effectively and in a radially compact way.

In a preferred embodiment of this actuator arrangement, the rotor has an inner-circumferential projection which engages into an outer-circumferential groove of the actuation member.

In this embodiment, the customary configuration of actuation members, such as shift sleeves, with an outer-circumferential annular groove may be essentially preserved.

Furthermore, in this case, it is advantageous if the rotor is coupled via a rotation/translation converter to a portion fixed to the housing, in such a way that, during rotation in relation to the stator, the rotor is displaced (offset) in the axial direction.

The conversion of the drive force of a rotationally acting electric machine into an axial movement of the actuation member can thus be implemented in a compact way.

According to a particularly preferred embodiment, the rotation/translation converter in this case has a converter portion on the outer circumference of the rotor.

A converter portion of this type can be implemented in a structurally simple way.

According to a further preferred embodiment, the portion fixed to the housing is in this case formed by the stator, so that the rotation/translation converter takes action between the rotor and the stator.

It is particularly advantageous in this case that there is no need for separate components in order to set up the rotation/translation converter.

Overall, in this embodiment, it is also advantageous if the projection is designed as an annular web which engages on the groove uniformly in the circumferential direction.

In this embodiment, tribological advantages are afforded, since the transmission of axial force to the actuation member (for example, the shift sleeve) can take place over comparatively large areas, in contrast for example, to a shift fork.

The annular web is preferably of continuous design, so that uniform force transmission is possible, without the risk of tipping or tilting of the actuation member.

Furthermore, according to a second aspect of the present invention, the above object is achieved by means of an actuator arrangement for the axial displacement of an actuation member by means of a drive force which is generated by an electric machine, in particular for a shift-clutch arrangement of a multi-step gear change transmission, the actuation member being mounted axially displaceably on a rotary shaft, and the electric machine having a stator fixed to the housing and a rotor which is coupled to the actuation member and is arranged coaxially with respect to the actuation member, the rotor being coupled to the actuation member via a rotation/translation converter, specifically in such a way that, during rotation in relation to the rotor, the actuation member is displaced in the axial direction.

In this embodiment, during operation, the rotor co-rotates with the actuation member (and consequently with the rotary shaft). Displacing (offsetting) of the actuation member in the axial direction takes place by means of relative rotation between the rotor and actuation member, that is to say in that the rotor is driven somewhat more slowly or somewhat more quickly than the actuation member for a specific period of time.

This embodiment can be implemented in an especially compact way particularly in the radial direction.

In the actuator arrangement according to the second aspect of the present invention, it is particularly advantageous if the rotation/translation converter has a converter portion on the inner circumference of the rotor.

In this embodiment, the rotation/translation converter can, for example, act directly between the rotor and the actuation member.

Furthermore, it is advantageous if the rotor is mounted axially on a portion fixed to the housing.

This may take place, for example, via plain bearings.

It is particularly advantageous, however, if the rotor or the portion fixed to the housing has a radial projection which engages into a radial groove of the other part.

In this embodiment, the axial support can be implemented particularly simply in structural terms.

It is particularly advantageous if the protection is designed as an annular web which engages on the groove uniformly in the circumferential direction.

In this case, again, tribological advantages are achieved, since the axial forces are transmitted over relatively large areas (annular-web flank).

According to an alternative embodiment, the rotor is supported in the axial direction at a guide sleeve connected with the rotary shaft (or at another part connected to the rotary shaft or at the rotary shaft itself).

Thereby, the axial support of the rotor can be made without support via the housing (or the stator) or via a wheel set. Thus, the assembly can be facilitated.

According to a third aspect of the present invention an actuator arrangement is provided which comprises an electrical machine having a stator and a rotor, which is arranged coaxially with the rotary shaft, wherein the rotor is coupled to an actuation member and wherein the stator is interrupted in the circumferential direction in order to provide construction space for adjacent components in the radial direction.

It is particularly preferred if this embodiment having a stator interrupted in the circumferential direction is used with any of the above-mentioned actuator arrangements.

Particularly in the case of use in a transmission, the construction space is often limited, for example by adjacent shafts or the like running parallel. In this instance, the stator may be interrupted in the circumferential direction in order to provide space here.

For this purpose, it is advantageous, furthermore, if the stator is adapted on the outer circumference to adjacent components, in such a way that the stator is of non-round design on the outer circumference.

In this embodiment, an existing construction space can be utilized particularly beneficially in that as large a volume as possible is provided for the stator windings. Consequently the highest possible power of the electric machine can be implemented within the existing construction space. Any shape deviating from a circular shape is to be understood here to mean non-round.

It is particularly advantageous, in this case, if the stator is adapted on the outer circumference to a housing.

Overall, in all the embodiments, it is preferable if, in a housing likewise accommodating the stator, the rotor does not require any separate mounting on the housing. The rotational movement of the rotor may advantageously be transmitted (directly or indirectly) to the actuation member via the rotation/translation converter.

The rotation/translation converter may be designed as a spindle mechanism, as a ball-screw mechanism, as a slotted guide, as a spring-hinge mechanism or the like.

In general, the transmission of axial force for displacing the actuation member does not take place in a punctiform manner, as in the case of a shift fork, but by means of components which have a large area and therefore present few problems in tribological terms.

Furthermore, it is advantageous if the electric machine is used as a generator, for example in the event of a jump in rotational speed from high to low rotational speeds. In this case, the rotational movement can be converted into electric energy (recuperation). The efficiency of a shift-clutch arrangement can thereby be greatly improved.

The features mentioned above and those yet to be explained below can be used not only in the combination specified in each case, but also in other combinations or alone, without departing from the scope of the present invention.

BRIEF DESCRIPTION OF THE SEVERAL VIEWS OF THE DRAWING

Exemplary embodiments of the invention are illustrated in the drawing and are explained in more detail in the following description. In the drawing.

DETAILED DESCRIPTION OF THE INVENTION

Figure 1:
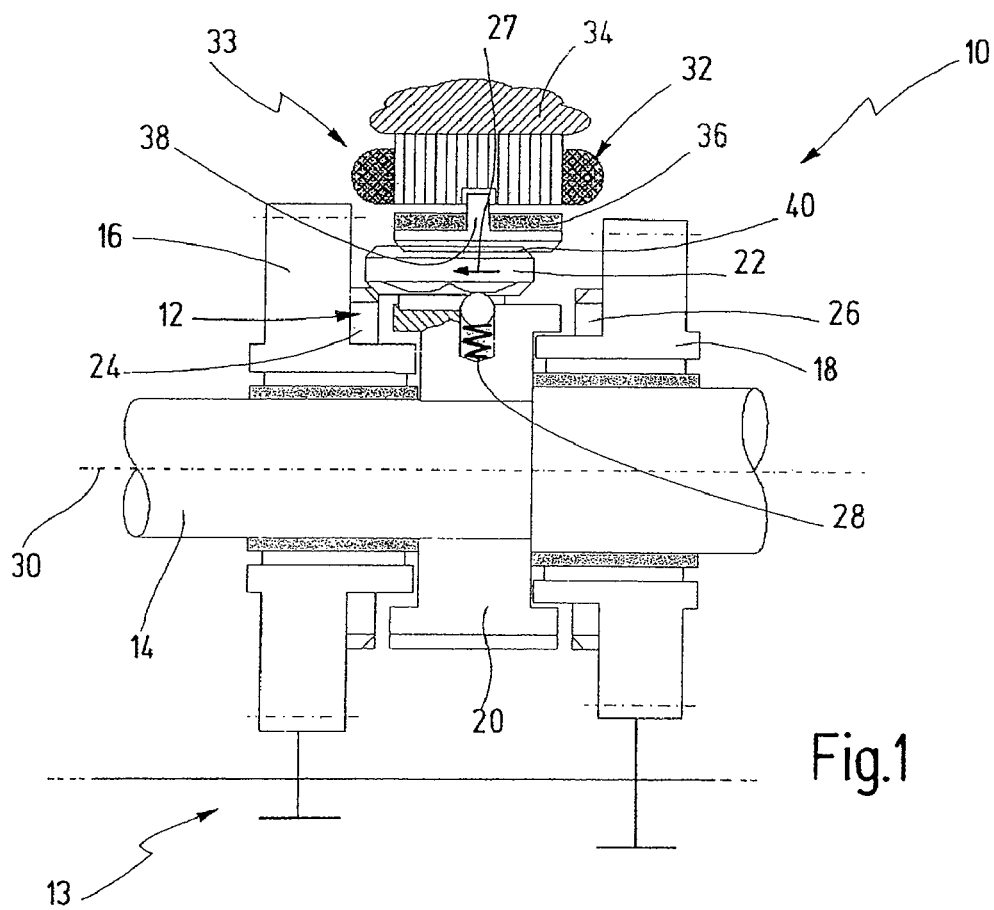
FIG. 1 shows a diagrammatic longitudinal sectional view through a first embodiment of a shift-clutch arrangement according to the invention.

In FIG. 1, a first embodiment of an actuator arrangement is designated in general by 10.

The actuator arrangement 10 serves for actuating a shift-clutch arrangement 12 of a multi-step gear change transmission 13. The multi-step gear change transmission 13 is indicated merely diagrammatically.

The shift-clutch arrangement 12 is assigned to a rotary shaft 14. On opposite sides of the shift-clutch arrangement 12 are arranged a first loose wheel 16 and a second loose wheel 18 which are mounted rotatably on the rotary shaft 14.

The shift-clutch arrangement 12 has a guide sleeve 20 with an external guide-sleeve toothing, not designated in any more detail. The guide sleeve 20 is secured fixedly in terms of rotation to the rotary shaft 14. Furthermore, the shift-clutch arrangement 12 has a shift sleeve 22 with an internal shift-sleeve toothing. The shift-sleeve toothing is in engagement with the guide-sleeve toothing, in such a way that the shift sleeve 22 is mounted fixedly in terms of rotation and axially displaceably with respect to the rotary shaft 14.

A first clutch body 24, which has an external clutch-body toothing, is secured to the first loose wheel 16. Correspondingly, a second clutch body 26, which has a corresponding external clutch-body toothing, is secured to the second loose wheel 18.

The shift sleeve 22 can be displaced axially such that the shift-sleeve toothing is pushed into one of the clutch-body toothings in each case, in order thereby to connect the assigned loose wheel 16, 18 fixedly in terms of rotation to the rotary shaft 14.

The axial force 27 required for the axial displacement of the shift sleeve 22 is generated by an electric machine which will be described below.

The shift-clutch arrangement 12 may contain any desired conventional synchronization, for example with a synchronizing ring (which is not illustrated in FIG. 1), but may also be designed as a dog clutch (without synchronization).

FIG. 1 shows at 28 a ball/spring latching system, as is also generally used in cone-type synchronizations.

Furthermore, an axis of rotation of the rotary shaft 14 is illustrated at 30 in FIG. 1.

As mentioned above, the drive force 27 is generated by means of an electric machine 33 which has a stator 32 and a rotor 36.

The stator 32 is secured to a housing 34 of the multi-step gear change transmission.

The electric machine 33 is designed as a rotary machine concentrically with respect to the axis of rotation 30. The electric machine 33 may be, for example, a brushless machine with a permanently excited rotor or with a rotor similar to a three-phase asynchronous machine.

The electric machine 33 is arranged radially around the shift-clutch arrangement 12. The stator 32 contains electrically activated coils (field coils) which may be connected electrically, for example, through the housing 34.

The rotor 36 is, in general, aligned with the stator 32 in the axial direction and for this purpose is mounted axially. This may take place via rolling bearings. In the present case, it is indicated diagrammatically that the rotor 36 has on its outer circumference a projection in the form of an annular web 38 which engages into a corresponding circumferential groove of a portion fixed to the housing (in the present case, of the stator 32). It will be appreciated that a projection may also be formed on the stator 32 and a corresponding groove may be formed on the rotor 36.

Between the rotor 36 and the shift sleeve 22, a rotation/translation converter 40 is provided, for example in the form of a threaded mechanism, a slotted guide, a ball-screw mechanism or the like.

During operation, in general, the rotor 36 rotates synchronously with the rotary shaft 14, so that no relative rotational speed occurs between the rotor 36 and the shift sleeve 22. Consequently, the shift sleeve 22 remains axially in the position thus set. For the axial adjustment of the shift sleeve 22, the rotational speed of the rotor 36 is lowered or raised with respect to the rotary shaft 14. The rotor 36 is thereby adjusted in the direction of rotation with respect to the shift sleeve 22. This is because this relative rotation is converted directly into an axial movement of the shift sleeve 22 by the rotation/translation converter 40. As soon as the desired axial travel of the shift sleeve 22 has been covered, the rotational speed of the rotor 36 is set again to the "synchronous rotational speed", that is to say to the same rotational speed as the rotary shaft 14.

In the present embodiment, therefore, the rotational speed of the shift-clutch arrangement 12 (or of the rotary shaft 14) is preferably taken into account in the electrical commutation of the field coil or field coils in the stator 32. This can easily be determined, for example, by detecting the input-shaft rotational speed of a transmission or in any part-train of a double-clutch transmission. This is because, as a rule, sensors are provided in any case for this purpose.

The desired relative rotation for adjusting the shift sleeve 22 is then added to or subtracted from this "synchronous rotational speed".

Preferably, the shift-clutch arrangement 12 lies on the side assigned to the output of the transmission 13 (consequently, in the case of a countershaft transmission, as a rule, on the output shaft). This makes it possible for the rotational speed dynamics of the engine (for example, internal combustion engine) of the motor vehicle in which the multi-step gear change transmission 13 is installed not to have to be applied to the same extent by the electric machine 33. In the case of high-speed and dynamic electric machines 33, however, this, too, is generally possible.

Figure 6:
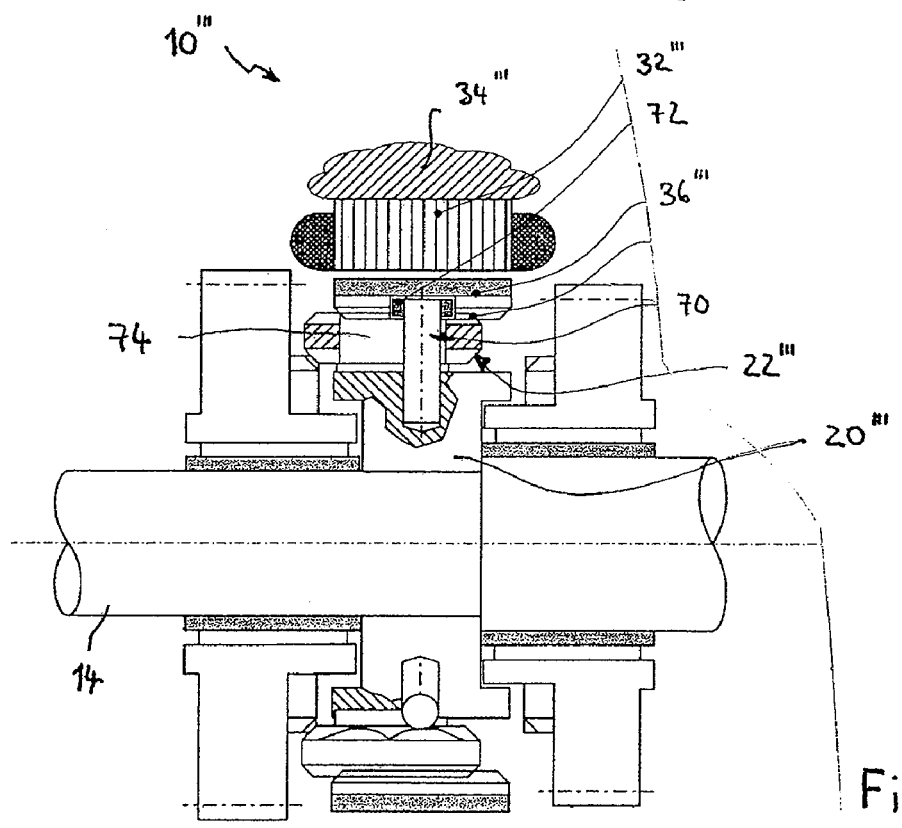
FIG. 6 shows a diagrammatic longitudinal sectional view through a modified embodiment of the shift-clutch arrangement of FIG. 1.

Furthermore, it is conceivable, in general, that the rotor 36 is not supported on the stator 32 in the axial direction, but on the guide sleeve 20 (for example, via corresponding recesses in the shift sleeve 22) (see FIG. 6).

The electric machine 33 may be equipped with a device for changing over the number of poles in the stator 32. The field frequency in the stator 32 can thereby be adapted to the rotary frequency or rotational speed of the rotary shaft 14 assigned to the shift-clutch arrangement 12.

The actuator arrangement 10 according to the invention and the shift-clutch arrangement 12 according to the invention, activated by means of the latter, can be used in all conceivable multi-step gear change transmissions 13, particularly in automated shift transmissions, in double-clutch transmissions, etc. It is in this case advantageous, in particular, that hydraulics are generally no longer necessary at all. This may be advantageous particularly when, for example, the assigned clutch (or double clutch) is also not adjusted hydraulically, but electromotively.

Furthermore, in the actuator arrangement 10 of FIG. 1, it is advantageous for assembly purposes if the rotor 36 and/or the stator 32 are/is of split design.

In the multi-step gear change transmission 13, a specific actuator arrangement 10 is provided preferably for each shift-clutch arrangement 12. Consequently, it is also possible to actuate in an overlapping way the gears assigned to different shift-clutch arrangements 12.

Furthermore, in the invention, it is advantageous that no shift linkages and also no auxiliary drives, such as, for example, shift rollers, are necessary. This also results, overall, in a compact type of construction and in a reduced overall construction space.

Travel control may be detected via sensors and then regulated. It is also possible, however, to carry out travel control without travel detection, in that the shift sleeve 22 is moved up against stops in its end positions. This makes it possible to ensure that the rotor 36 always remains in the field region of the stator 32.

The limit stops may, however, also be sensed by sensors.

Figure 2:
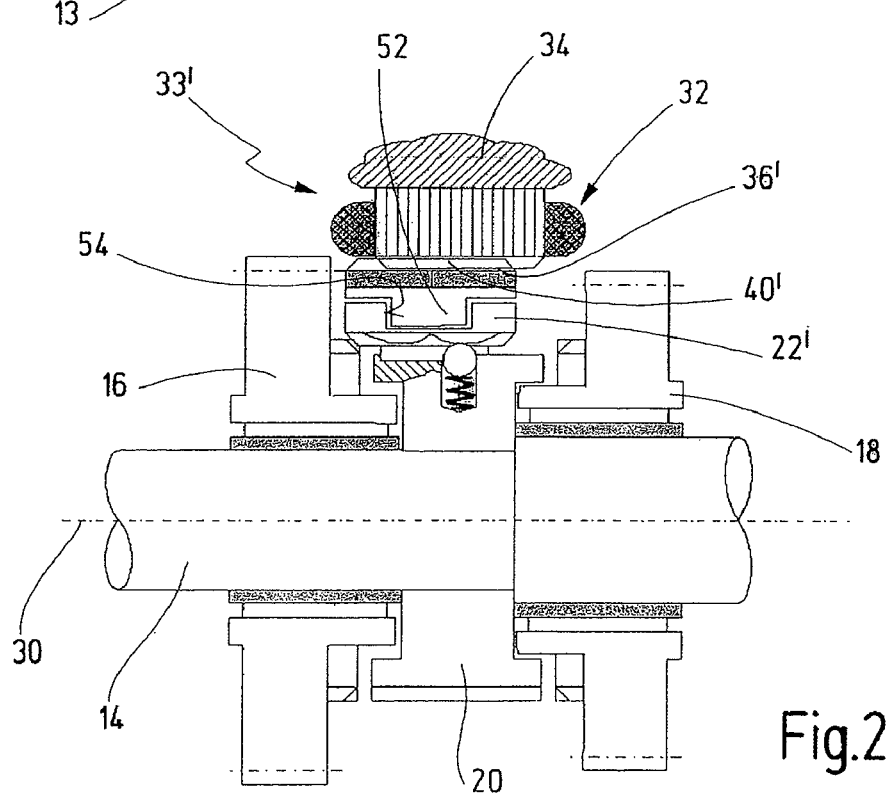
FIG. 2 shows a diagrammatic longitudinal sectional view through a second embodiment of a shift-clutch arrangement according to the invention.

FIG. 2 shows an alternative embodiment of an actuator arrangement 50 according to the invention. The actuator arrangement 50 corresponds in general to the actuator arrangement 10 of FIG. 1 in terms of construction and functioning. Identical elements are therefore also indicated by the same reference numerals. Only the differences are dealt with below.

In the actuator arrangement 50, a rotation/translation converter 40' is arranged between the rotor 36' and the stator 32. The rotor 36' is normally stationary during operation. When current is applied to the field coils of the stator 32, the rotor 36' rotates and is displaced axially by means of the rotation/translation converter 40'. The rotation/translation converter 40' is in this case preferably provided directly between the stator 32 and rotor 36'.

Furthermore, the rotor 36' is coupled to a shift sleeve 22' with a form fit in the axial direction. In the present case, a projection in the form of a continuous annular web 52 is formed on the inner circumference of the rotor 36'. Correspondingly, a continuous outer-circumferential radial groove 54, into which the annular web 52 engages, is formed on the shift sleeve 22'.

It is also possible, however, to provide a corresponding projection or annular web on the shift sleeve 22 and a corresponding radial groove on the rotor 36'.

In this embodiment, too, it is advantageous that, on account of the continuous annular web 52, the axial forces transmitted to the shift sleeve 22' are transmitted over a comparatively large area, so that the differential rotational speeds generally occurring between the rotor 36' and the shift sleeve 22' can be controlled effectively in tribological terms.

Figure 3:
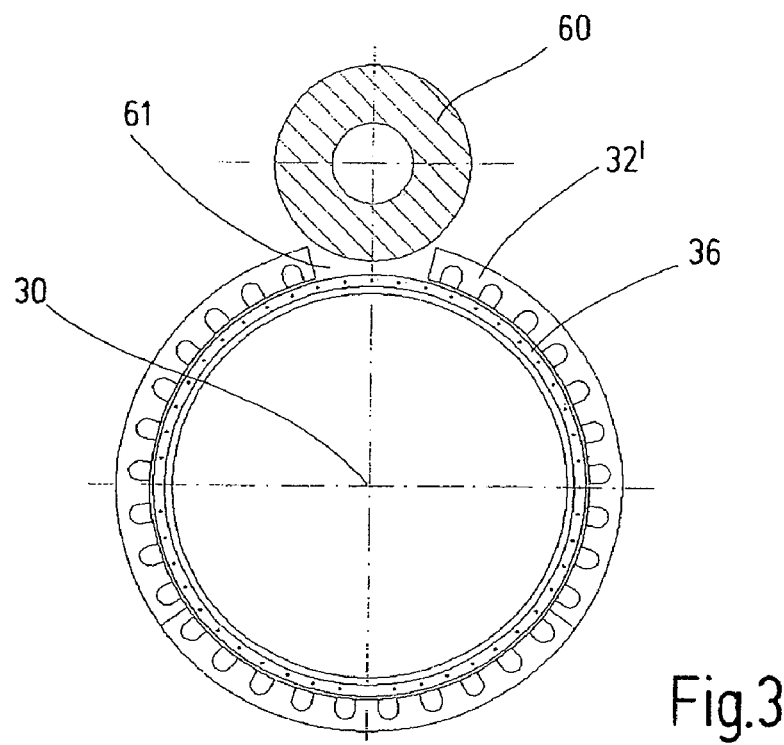
FIG. 3 shows a diagrammatic cross-sectional view through part of an actuator arrangement according to the invention, in one embodiment.

FIG. 3 illustrates a cross-sectional view of an electric machine 33 in diagrammatic form.

It can be seen that the stator 32', in general, is of circular design on its inner circumference and is adapted to the outer circumference of the likewise circular rotor 36. So that the electric machine 33 can be used even in confined installation positions, for example when a shaft 60 is directly adjacent, there may be provision for cutting out the stator 32' at one or more points or for it to have an interrupted design. Such an interruption or cutout is shown at 61 in FIG. 3.

Figure 4:
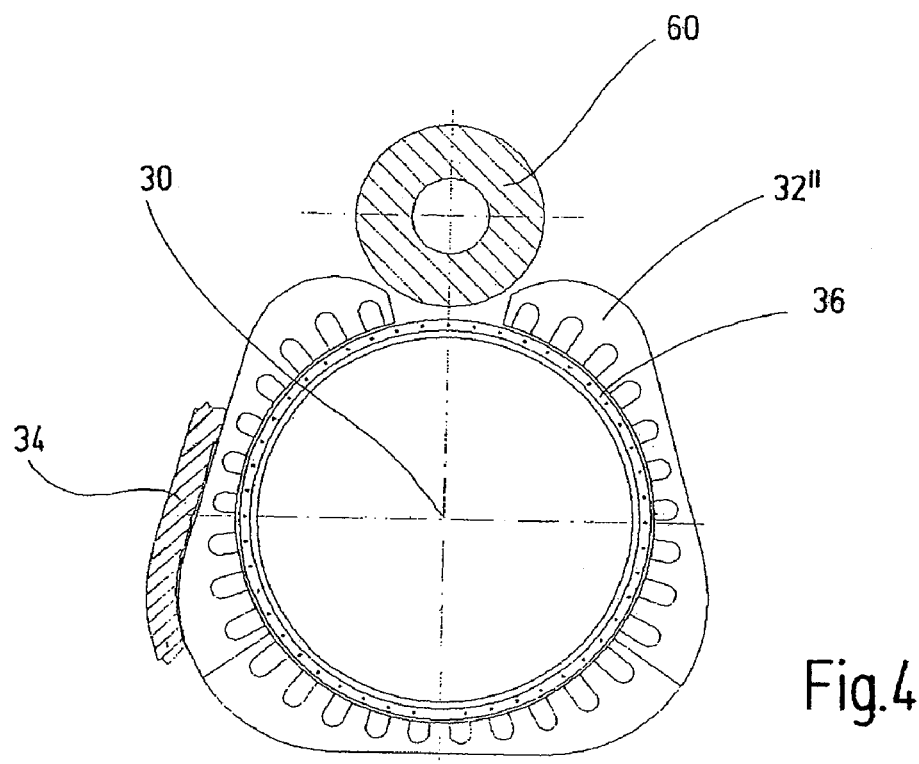
FIG. 4 shows a diagrammatic cross-sectional view through an actuator arrangement according to a further embodiment of the invention.

As shown in FIG. 4, it is also possible to design the stator 32" or its casing on its outer circumference in such a way (non-round) that it is adapted to adjacent components, such as, for example, a housing 34.

The existing construction space can thereby be used for accommodating as large field coils as possible. Also, a form-fit torque support via the housing 34 can be implemented.

Figure 5:
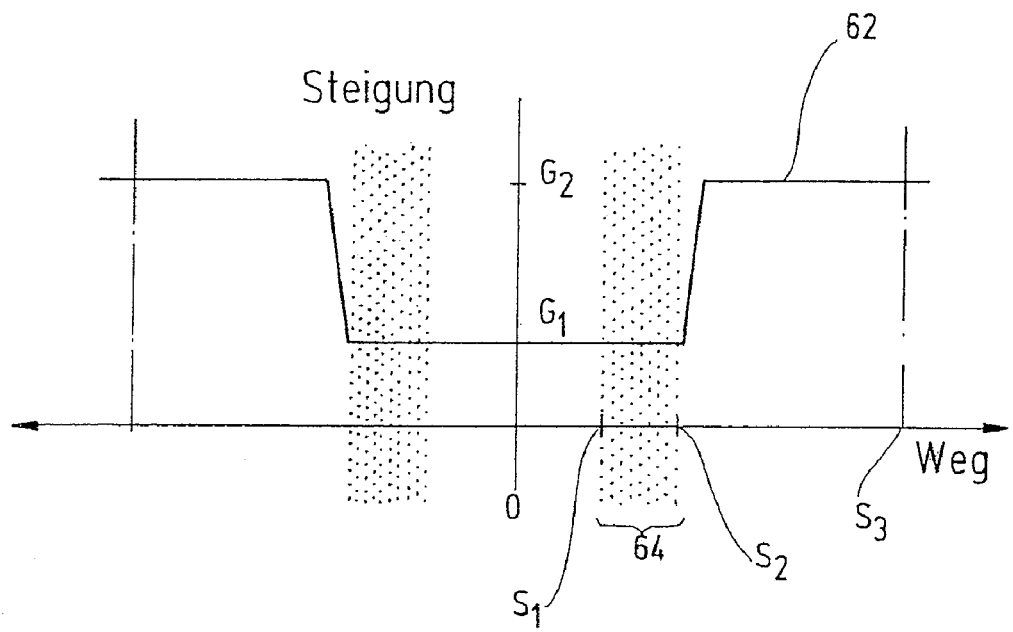
FIG. 5 shows a characteristic curve, of gradient against travel, of a rotation/translation converter which is used in an actuator arrangement according to the invention.

Furthermore, FIG. 5 illustrates, in diagrammatic form, a graph of the gradient 62 of a rotation/translation converter 40 against the travel of the shift sleeve 22.

It can be seen that the gradient can be designed to be relatively low, for example to the value of $G_1$, in a range from a zero position of the shift sleeve 22 to beyond a synchronization region 64.

Beyond the synchronization travel segment, the characteristic curve 62 may possess a very much higher gradient $G_2$.

A higher gradient, in this context, means that, with the angle of rotation being the same, a greater translational movement is generated. In the travel phase of the shift sleeve 22 for selecting a gear step, a form fit with the clutch body is to be made as quickly as possible after synchronization. In order to achieve this, the gradient is increased to a higher value $G_2$, in order thereby, with the rotational speed remaining the same, to move the shift sleeve 22 more quickly and consequently to make a form fit more quickly.

FIG. 6 shows a modified embodiment of the shift-clutch arrangement 12 of FIG. 1, which comprises a modified actuator arrangement 10'''. The actuator arrangement 10''' corresponds in general to the actuator arrangement 10 of FIG. 1 in terms of construction and functioning. Identical elements are therefore also indicated by the same reference numerals. Only the differences are dealt with below.

The rotor 36''' is connected in the axial direction with the guide sleeve 20''' (or any other component fixedly connected to the shaft 14) in the actuator arrangement 10'''.

Thereby, the efforts for assembly of the actuator arrangement 10''' can be simplified against the actuator arrangement 10 of FIG. 1. A direct coupling between the rotor 36''' and the stator 32''' is not necessary. These elements can be connected with each other via an air gap alone.

The connection of the rotor 36''' to the guide sleeve 20''' is made via a radial pin 70 (however, as a rule, via a plurality of radial pins 70 that are distributed via the circumference), which engages in a annular groove of the rotor 36'''. The radial pin 70 protrudes in the radial direction against the guide sleeve 20''' and is fixedly connected thereto. The axial support of the rotor 36''' at the radial pin 70 can be made via one or more friction rings 72 in order to reduce friction.

To this purpose, the radial pin 70 penetrates the modified shift sleeve 22'''. To be exact, the shift sleeve 22''' comprises an axial opening 74 for the radial pin 70, so that the radial pin 70 can penetrate the shift sleeve 22''' essentially without interference.

In the actuator arrangements 10, 10''' of FIGS. 1 and 6, energy can be recovered during braking of the rotor. Further, the electrical machine 33 can support critical synchronization processes, depending on the embodiment of the rotation/translation converter 40.

What is claimed is:

1. An actuator arrangement for the axial displacement of an actuation member by means of a drive force which is generated by an electric machine, the actuation member is mounted to rotate with a rotary shaft and is mounted axially displaceably on the rotary shaft, the electric machine having a stator that is fixed to a housing and drives a rotor which is coupled to the actuation member and is arranged coaxially with respect to the actuation member, wherein the rotor is coupled to the actuation member via a rotation/translation converter, in such a way that, when the rotor is driven to rotate synchronously with the rotary shaft, there is no relative rotational speed between the rotor and the actuation member and the actuation member maintains its axial position; and, when the rotor is driven to rotate slower of faster than the rotary shaft, the actuation member is displaced in the axial direction by the rotation/translation converter.

2. The actuator arrangement according to claim 1, wherein the rotation/translation converter has a converter portion on the inner circumference of the rotor.

3. The actuator arrangement according to claim 1, wherein the rotor is mounted axially on a portion fixed to the housing.

4. The actuator arrangement according to claim 3, wherein the rotor or the portion fixed to the housing has a radial projection which engages into a radial groove of another part.

5. The actuator arrangement according to claim 4, wherein the projection is designed as an annular web which engages on the groove uniformly in the circumferential direction.

6. The actuator arrangement according to claim 1, wherein the rotor is supported in the axial direction at a guide sleeve connected to the rotary shaft.

7. The actuator arrangement according to claim 1, the stator and the rotor being arranged coaxially with respect to the rotary shaft, and wherein the stator is interrupted in the circumferential direction in order to provide construction space for adjacent components in the radial direction.

8. The actuator arrangement according to claim 1, wherein the stator is adapted on the outer circumference to adjacent components, in such a way that the stator is of non-round design on the outer circumference.

9. The actuator arrangement according to claim 8, wherein the stator is adapted on the outer circumference to a housing.

10. The actuator arrangement according to claim 1, wherein the rotation/translation converter sets up a non-linear characteristic curve between angle of rotation and axial travel.

* * * * *